United States Patent [19]

Barcza

[11] Patent Number: 5,285,637
[45] Date of Patent: Feb. 15, 1994

[54] SEAL CENTERING AND RESTRAINING DEVICE FOR AN AXISYMMETRIC CONVERGENT/DIVERGENT NOZZLE

[75] Inventor: William K. Barcza, Stuart, Fla.

[73] Assignee: United Technologies Corporation, Hartford, Conn.

[21] Appl. No.: 970,211

[22] Filed: Nov. 2, 1992

[51] Int. Cl.⁵ .............................................. F02K 1/00
[52] U.S. Cl. .................................... 60/230; 60/232; 239/265.19; 239/265.35; 239/265.41
[58] Field of Search ........................ 60/230, 232, 271; 239/265.19, 265.35, 265.39, 265.41

[56] References Cited

U.S. PATENT DOCUMENTS

| | | | |
|---|---|---|---|
| 3,004,385 | 10/1961 | Spears, Jr. et al. | 239/265.41 |
| 3,954,225 | 5/1976 | Camboulives et al. | 239/265.41 |
| 4,128,208 | 12/1978 | Ryan et al. | 60/271 |
| 4,878,618 | 11/1989 | Hufnagel | 239/265.39 |
| 4,994,660 | 2/1991 | Hauer | 60/230 |
| 5,039,014 | 8/1991 | Lippmeier | 60/271 |
| 5,150,839 | 9/1992 | Reedy | 239/265.41 |
| 5,174,502 | 12/1992 | Lippmeier et al. | 60/232 |

*Primary Examiner*—Richard A. Bertsch
*Assistant Examiner*—Michael I. Kocharov
*Attorney, Agent, or Firm*—Christopher T. Hayes

[57] ABSTRACT

A seal centering and restraining device for positioning the seals between the divergent flaps of a vectoring convergent/divergent nozzle. The device includes a restraint bar that spans between two adjacent divergent flaps and is pivotally attached to the air side of a seal and slidably secured by sliders to tracks on the adjacent divergent flaps, thereby sandwiching the adjacent divergent flaps between the seal and sliders. A positioning linkage connecting the two adjacent divergent flaps centers the seal at all nozzle operating conditions.

10 Claims, 8 Drawing Sheets

SEAL CENTERING AND RESTRAINING DEVICE FOR AN AXISYMMETRIC CONVERGENT/DIVERGENT NOZZLE

TECHNICAL FIELD

The invention relates to gas turbine engines and in particular to axisymmetric thrust vectoring nozzles therefor.

BACKGROUND OF THE INVENTION

One of the goals of designers of high performance gas turbine aircraft engines has been to achieve thrust through the use of vectoring exhaust nozzles. To achieve this goal, engine designers have sought to improve the convergent/divergent axisymmetric nozzle to incorporate thrust vectoring while retaining the benefits of the underlying nozzle. One such improvement, shown in U.S. Pat. No. 5,082,182 entitled "Thrust Vectoring Exhaust Nozzle" issued Jan. 21, 1992 to Bruchez, Jr. et al and incorporated herein by reference, discloses an axisymmetric nozzle which is capable of positioning the divergent flaps of the nozzle such that the divergent flaps are not symmetric with respect to the longitudinal axis of the divergent section of the nozzle, while the convergent flaps remain symmetric. Another vectoring nozzle, disclosed in U.S. Pat. No. 4,994,660 entitled "Axisymmetric Vectoring Exhaust Nozzle" issued Feb. 19, 1991 to Hauer and incorporated herein by reference, discloses an axisymmetric nozzle which is capable of positioning the divergent flaps of the nozzle asymmetrically with respect to the longitudinal axis of the divergent section of the nozzle. Here again, the convergent flaps remain symmetric.

The convergent sections of the aforementioned thrust vectoring nozzles are essentially the same as that of the non-vectoring convergent/divergent axisymmetric nozzle which is well known in the art. Accordingly, adequate sealing techniques for preventing the escape of exhaust gas through the convergent flaps during engine operation are well known.

In the divergent section, each of these prior art nozzles incorporates a plurality of circumferentially arranged divergent flaps. Each of the divergent flaps has a "gas side", the surface of the divergent flap exposed to the exhaust gas of the engine, and an "air side", the surface of the divergent flap opposite the gas side. Divergent seals are located between, and overlap, adjacent divergent flaps to prevent the escape of the exhaust gas through the gaps between the divergent flaps. However, because the divergent flaps of these vectoring nozzles can move both radially and laterally, the prior art seals for the divergent section do not provide the desired sealing during the vectored exhaust condition.

In the aforementioned vectoring engines, all of the divergent flaps move in the same direction relative to the longitudinal axis of the divergent section during vectoring of the nozzle. This causes some of the divergent flaps to become radially offset relative to adjacent divergent flaps, while the trailing edges of other divergent flaps become axially offset relative to adjacent divergent flaps. Consequently, when the nozzle is in the vectored condition, the divergent seals must be able to twist up to twenty degrees or more along its length to maintain adequate sealing contact with the adjacent divergent flaps. Additionally, at both vectored and non-vectored conditions, the divergent seal must also remain centered between adjacent divergent flaps to ensure that the seal spans the entire gap between the adjacent divergent flaps.

What is needed is a device for positioning of the divergent seals that can tolerate the axial and radial offsets of the divergent flaps while ensuring that the sealing surfaces of the seal sealingly contact the adjacent divergent flaps at both vectored and non-vectored nozzle operating conditions.

SUMMARY OF THE INVENTION

It is therefore an object of the present invention to provide a device that maintains sealing contact between the sealing surfaces of the seal and the adjacent divergent flaps at all vectored and non-vectored nozzle operating conditions.

Another object of the present invention is to provide a device that centers the divergent seal between adjacent divergent flaps during both radial and axial offsets thereof.

Accordingly, the device of the present invention comprises a restraint bar pivotally connected to the mounting post of a backbone support that supports the seal along the length thereof. The restraint bar has two arms, each arm extending along the air side of one of the adjacent divergent flaps. A slider is pivotally connected to each arm adjacent the terminal end thereof, and each slider slidably contacts the air side of one of the adjacent divergent flaps. Each slider overlays a portion of the divergent seal, and the adjacent divergent flaps are sandwiched between the seal and one of the sliders, compressively loading the seal against the adjacent divergent flaps. A positioning linkage connected to each of the adjacent divergent flaps and to the restraint bar adjacent one of the sliders moves the seal in response to relative movement between the adjacent divergent flaps, moving the seal one-half of the relative change in distance between the adjacent divergent flaps, and in the same direction.

DESCRIPTION OF THE PREFERRED EMBODIMENT

Figure 1:
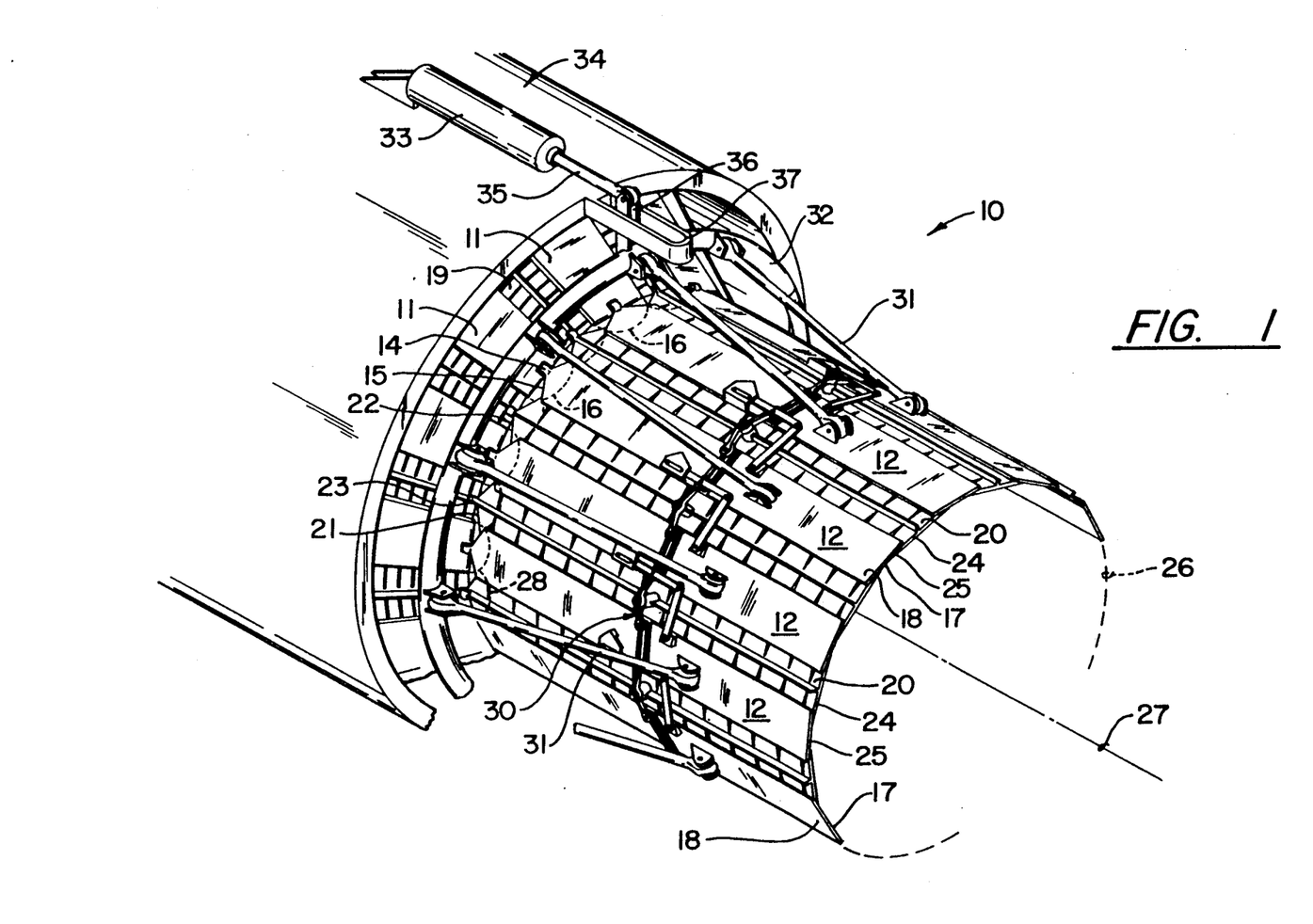
FIG. 1 is a partial isometric view of a convergent/divergent nozzle incorporating the present invention.

FIG. 1 shows a convergent/divergent nozzle 10 incorporating convergent flaps 11 with elongated divergent flaps 12 pivotally attached to the trailing edge 13 thereof by a divergent flap hinge 14 at the leading edge 15 of the divergent flap 12. The convergent/divergent flap assembly includes a flap hinge seal 16 which overlays the hinge 14 to prevent the escape of the exhaust gas of the gas turbine engine at the hinge 14. Each of the divergent flaps 12 has a gas side 17 and an air side 18. As used herein, the term "gas side" refers to the surface of the respective component that is exposed to the exhaust gas of the engine, and the term "air side" refers to the surface of the component opposite the gas side.

A convergent seal 19 is located between each pair of adjacent convergent flaps 11 and a divergent seal 20 is likewise positioned between each pair of adjacent divergent flaps 12 in sealing contact with the gas side 17 thereof. The leading edge 21 of each divergent seal 20 is pivotally connected to the trailing edge 22 of the convergent seal 19 immediately upstream therefrom by a seal hinge 23 and a seal hinge seal 28 overlays the seal hinge 23 to prevent the escape of exhaust gas at the seal hinge 23. The trailing edges 24 of the divergent seals 20 and the trailing edges 25 of the divergent flaps 12 define the perimeter 26 of the exhaust area of the nozzle 10. The divergent seals 20 are located radially inward of the divergent flaps 12 relative to the longitudinal axis 27 of the divergent section of the nozzle 10, on the side 17 of the divergent flaps 12 which is exposed to the engine exhaust gas. A seal centering and restraining device 30 of the present invention is attached to each of the divergent flap seals 20 and to the adjacent divergent flaps 12.

The throat area of the nozzle is controlled by the convergent flaps 11 through the "balanced beam" arrangement known in the art and disclosed in U.S. Pat. No. 5,082,182 referenced above. The exhaust area and thrust vectoring are controlled as follows.

Each of the divergent flaps 12 is pivotally connected to a sync-ring linkage 31, which is in turn pivotally connected to the sync-ring 32. Three actuators 33 (only one shown in FIG. 1) are mounted to the engine case 34 to 120° intervals. The arm 35 of each actuator 33 is pivotally connected to a sync-ring bracket 36 which is slidably received within a guide 37 fixedly secured to the engine case 34. From the foregoing description, those skilled in the art will readily appreciate that if the actuators 33 act symmetrically on the sync-ring 32, the sync-ring 32 translates along the axis of the nozzle 10, thereby increasing or decreasing the exhaust area of the nozzle 10. If, however, the actuators 33 act asymmetrically on the sync-ring 32, the sync-ring 32 tilts, the divergent flaps 12 are positioned asymmetrically, and the exhaust gas discharged from the engine is vectored in a direction which is not perpendicular to the throat plane of the nozzle 10.

Figure 2:
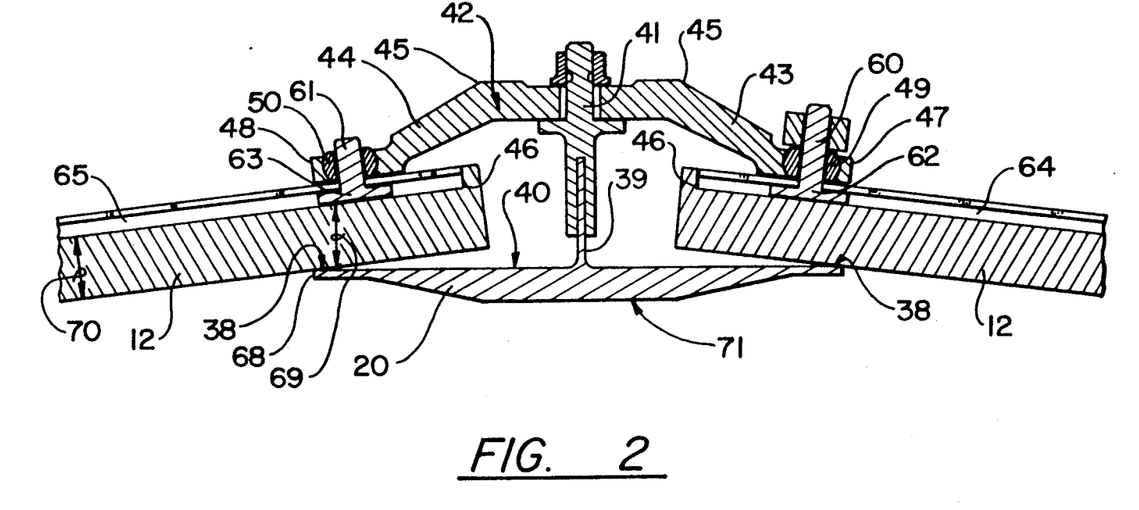
FIG. 2 is a sectional view of the seal centering and restraining device of the present invention taken along line 2—2 of FIG. 1.

As shown in FIG. 2, each seal spans 20 between two adjacent divergent flaps 12, and the sealing surfaces 38 of each divergent seal 20 sealingly contact the adjacent divergent flaps 12. At the mid-span of each seal 20 is a backbone support 39 which extends longitudinally of the seal 20 and is secured to the air side 40 thereof. The backbone support 39 provides rigidity along the length of the seal 20, but allows the seal 20 to twist along its length in response to the action of the divergent flaps 12. The ability to twist is critical to maintaining the sealing contact between the seal 20 and adjacent divergent flaps 12 during vectoring of the divergent flaps 12.

The backbone includes a restraint mounting post 41 to which is rotatably attached a divergent seal restraint bar 42. The mounting post 41 is perpendicular to the seal 20, and the restraint bar 42 is rotatable in a plane perpendicular to the mounting post 41. The restraint bar 42 has two arms 43, 44 that extend in substantially opposite directions from the mounting post 41 on the air side 18 of the adjacent divergent flaps 12, and each arm 43, 44 preferably includes a bend 45 which angles the arm towards the seal 20 to ensure that the longitudinal edges 46 do not contact the restraint bar 42 during nozzle operation.

Figure 3:
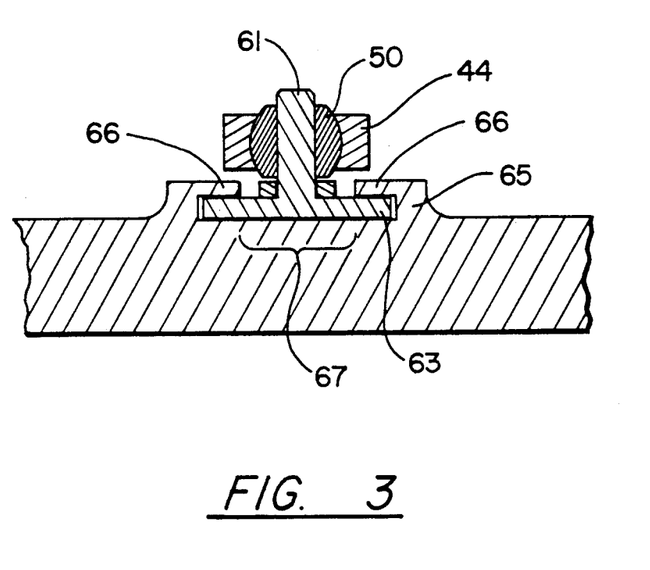
FIG. 3 is a sectional view taken along line 3—3 of FIG. 4.

Disposed within each arm 43, 44 adjacent the terminal end 47, 48 thereof is a spherical bearing 49, 50 that is connected to the connecting pin 60, 61 of a slider 62, 63, thereby pivotally attaching each of the arms 43, 44 to one of the sliders 62, 63. One of the slider pins 60 is longer than the other 61 for the reason discussed below. Each slider 62, 63 fits within a track 64, 65 that extends transversely across the air side 18 of the adjacent divergent flaps, the sliders 62, 63 slide in these tracks 64, 65, and as shown in FIG. 3, each track 64, 65 has a lip 66 to prevent the slider 62, 63 therein from lifting out the track 64, 65. Conversely, each of the sliders 62, 63, which are preferably circular in shape, has a diameter greater than the opening defined by the lips 66 of the track 65. Thus the sliders 62, 63 are constrained to slide within the tracks 64, 65, and can be removed therefrom only by sliding the sliders 62, 63 out one of the open ends of the track 64, 65. As the angle between adjacent divergent flaps 12 changes, the spherical bearings 49, 50 allow the sliders 62, 63 to slide in the tracks 64, 65 without binding.

Figure 4:
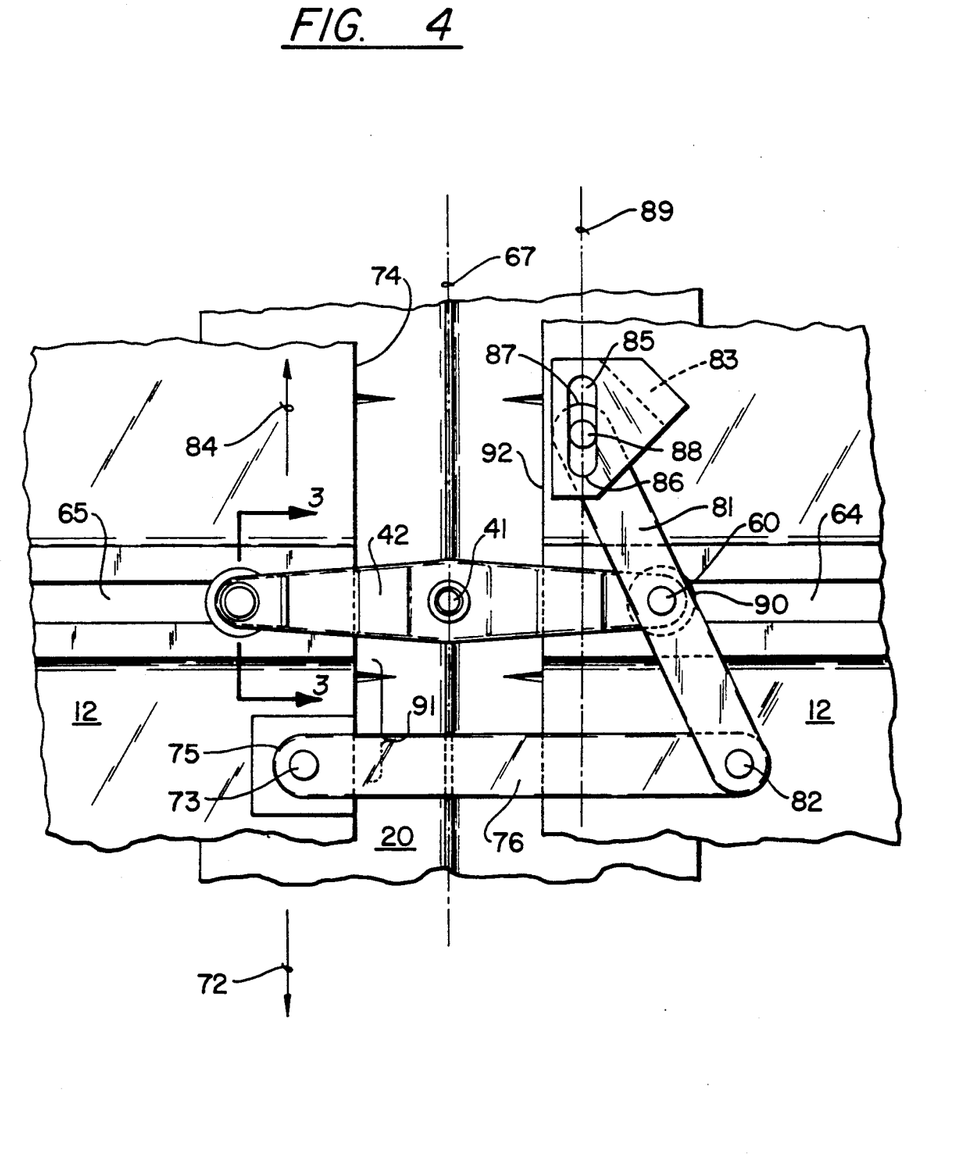
FIG. 4 is a plan view of the seal centering and restraining device shown in FIG. 1.

The position and orientation of the tracks 64, 65 on each of the divergent flaps 12 are substantially identical with each of the tracks 64, 65 located near the mid-length point of each divergent flap 12 so that when the nozzle 10 is in a non-vectored condition, the restraint bar 42 is perpendicular to the longitudinal axis 67 of the backbone support 39, as shown in FIG. 4. The centering and restraining device 30 of the present invention allows force to be transferred between the arms 43, 44 and the divergent flaps 12 in a direction normal to the respective divergent flap 12. Referring again to FIG. 3, the divergent flaps 12 adjacent the device 30 are slidably received between the respective slider 62, 63 and the seal 20. The nominal distance 69 between a slider 63 and the seal edge 68 it overlays is slightly less than the thickness 70 of the divergent flap 12, thereby providing a slight compressive pre-load between the divergent flap 12 and the seal 20 to ensure sealing contact between the seals 20 and the divergent flaps 12 at all nozzle operating conditions. The flexibility of the restraint bar 42 and the seal 20 must be such that the distance 69 between the slider 62, 63 and seal edge 68 can increase by up to ten percent without permanently deforming the restraint bar 42 or seal 20, while maintaining the compressive pre-load. This compressive pre-load is necessary when the nozzle 10 operates at an overexpanded condition, and may occur when the seal 20 is vectored away from the exhaust gas flow stream, since either condition could result in the static pressure on the air side 40 of the seal 20 being greater than the static pressure on the gas side 71 thereof.

Figure 5:
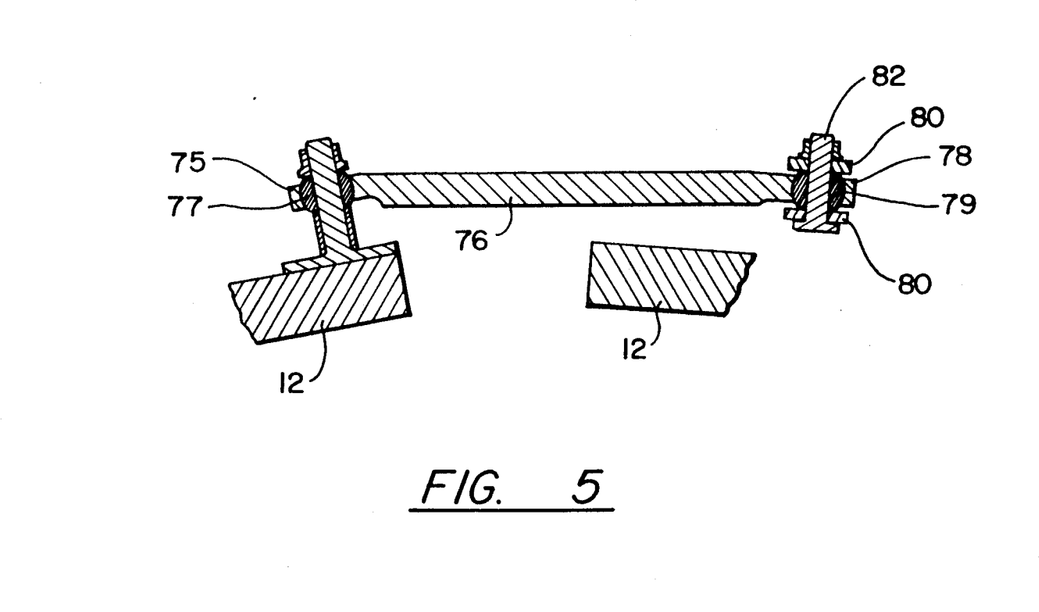
FIG. 5 is a sectional view taken along line 5—5 of FIG. 1.

Referring to FIGS. 4 and 5, aftward 72 of the track 65 on the air side 18 of one of the adjacent divergent flaps 12 is a seal positioning post 73. The positioning post 73 is fixedly secured to the divergent flap 12 adjacent the edge 74 which overlies the seal 20. The positioning post 73 is pivotally connected to one end 75 of a positioning link 76 by a spherical bearing 77 disposed therein. The opposing end 78 of the link 76 also has a spherical bearing 79 disposed therein which is pivotally connected to the aft end 80 of the positioning lever 81 by a link pin 82. The positioning link 76, the lever 81, and the spherical bearing 79 and pin 82 which join the link 76 and lever 81 comprise the positioning linkage.

A positioning bracket 83 is fixedly secured to the adjacent divergent flap 12 opposite the divergent flap 12 on which the positioning post 73 is located. The positioning bracket 83 is located forward 84 of the track 65, and includes a positioning guide slot 85 extending longitudinal of the divergent flap 12 in a direction perpendicular to the track 64 of the same divergent flap 12. The aftward end 86 of the guide slot 85 is forward 84 of the track 64, for the reason discussed below. The forward end 87 of the positioning lever 81 has a positioning pin 88 disposed therein, and the positioning pin 88 is constrained by the guide slot 85 to move only perpendicular to the track 64, defining a path along a reference line 89 extending longitudinal of the divergent flap 12. At the mid-point 90 of the lever 81, at a point equidistant from the link pin 82 and the positioning pin 88, the lever 81 is rotatably attached to the longer slider pin 60 described above.

The positioning post 73 is preferably mounted at a distance 91 from the track 65 such that when the divergent flaps 12 are non-vectored and the nozzle exhaust is at minimum area, the positioning link 76 is substantially parallel to the tracks 64, 65, as shown in FIG. 4. As those skilled in the art will readily appreciate, the distance from the center of the longer slider pin 60 to the reference line 89 will always be approximately one-half of the distance from the center of the link pin 82 to the reference line 89, thereby positioning the mounting post 41 (and thus the seal 20) midway between the edges 74, 92 of the adjacent divergent flaps 12.

Figure 6:
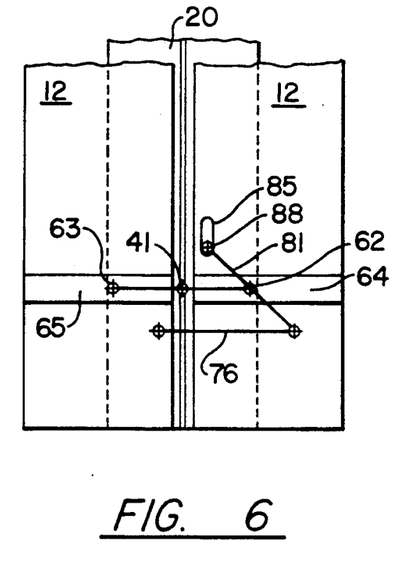
FIGS. 6-9 schematically show the linkage effect of the present invention at different nozzle conditions.

The operational effect of the linkage arrangement of the present invention is shown schematically in FIGS. 6-9. FIG. 6 shows the adjacent divergent flaps 12 of FIG. 4 with the nozzle 10 set at axial (non-vectored) thrust and minimum throat area. The positioning pin 88 is near its aftmost position in the positioning guide slot 85, and the positioning link 76 is substantially parallel to the tracks 64, 65. Because the aftmost point of the guide slot 85 is offset forward from the adjacent track 64, the lever 81 cannot reach a "top-dead-center" condition where the device 30 could lock up. Note that the mounting post 41 of the seal is centered between the divergent flaps 12.

Figure 7:
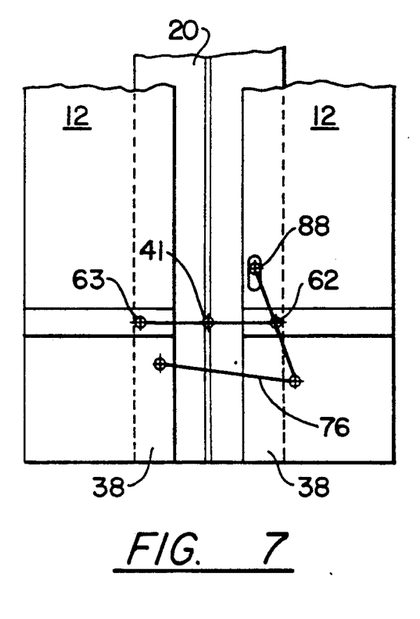

FIG. 7 shows the adjacent divergent flaps 12 of FIG. 6 with the nozzle 10 set at axial (non-vectored) thrust and maximum throat area. The device 30 of the present invention positions the mounting post 41 midway between the adjacent divergent flaps 12. Note that the positioning pin 88 is at its forwardmost position and has bottomed out at this maximum throat condition and therefore prevents the slider 62 from sliding out the end of the track 64. Note also that at this condition, the divergent flaps 12 remain sandwiched between the sliders 62, 63 and the seal 20, maintaining sealing contact between the sealing surfaces 38 of the seal 20 and the gas side of the divergent flaps 12.

Figure 8:
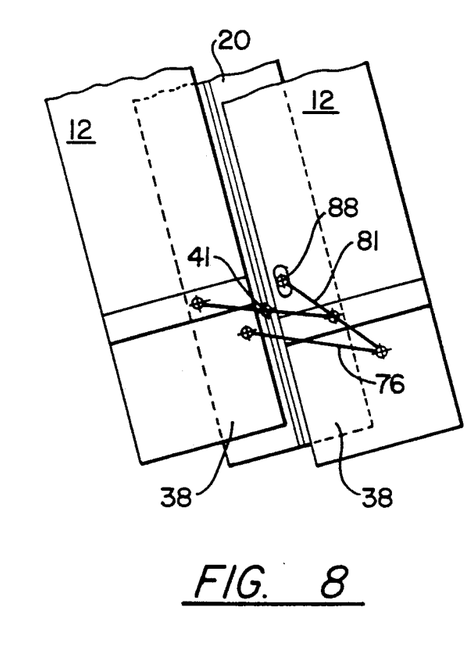

FIG. 8 shows the divergent flaps 12 of FIG. 6 at minimum throat area and a vectored nozzle condition. Again, the device 30 of the present invention positions the mounting post 41 midway between the adjacent divergent flaps 12, and the desired sealing contact between the sealing surfaces 38 of the seal 20 and the gas side of the divergent flaps 12 is maintained.

Figure 9:
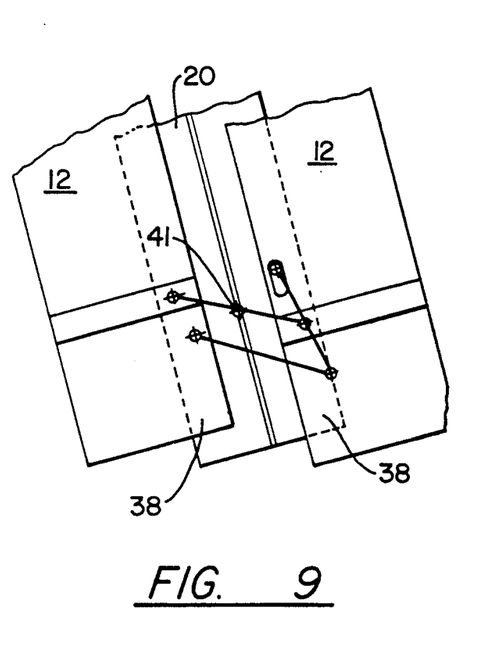

FIG. 9 shows the divergent flaps 12 of FIG. 6 at a maximum throat area and a vectored nozzle condition. Once again, the device 30 of the present invention positions the mounting post 41 midway between the adjacent divergent flaps 12, and the desired sealing contact between the sealing surfaces 38 of the seal 20 and the gas side of the divergent flaps 12 is maintained. The positioning pin 88 is near its aftmost position in the positioning guide slot 85, and the positioning link 76 is substantially parallel to the tracks 64, 65. Because the aftmost point of the guide slot 85 is offset forward from the adjacent track 64, the lever 81 cannot reach a "top-dead-center" condition where the device 30 could lock up. Note that the mounting post 41 of the seal is centered between the divergent flaps 12.

Figure 10:
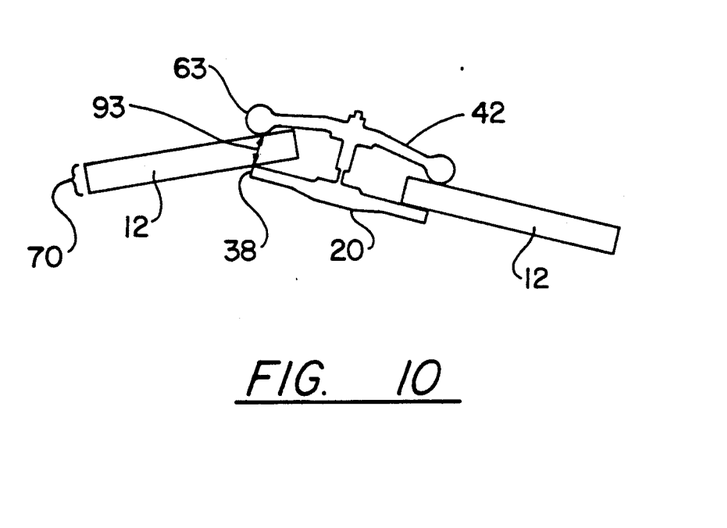
FIG. 10 shows a radial offset condition.

FIG. 10 shows the longitudinal view of FIG. 2 at a condition wherein the divergent flaps 12 are radially offset from one another. As used herein, the term "radially offset" means that the trailing edge 25 of one of the divergent flaps 12 is positioned at a greater distance from the longitudinal axis 27 of the divergent section of the nozzle 10 than the trailing edge 25 of an adjacent divergent flap 12 and the trailing edge 24 of the adjacent seals 20. This may occur at some vectored nozzle conditions and results in the distance 93 between one sealing surface 38 of the seal 20 and the slider 63 that overlies it being greater than the thickness 70 of the divergent flap 12. Note that the combination of the restraint bar 42 and the seal 20 flexes under this condition, thereby maintaining sealing contact between the seal 20 and divergent flap 12, while returning to the original position when the nozzle 10 returns to a condition at which the distance 93 between the slider 63 and the sealing surface 38 is equal to the thickness 70 of the divergent flap 12.

Figure 11:
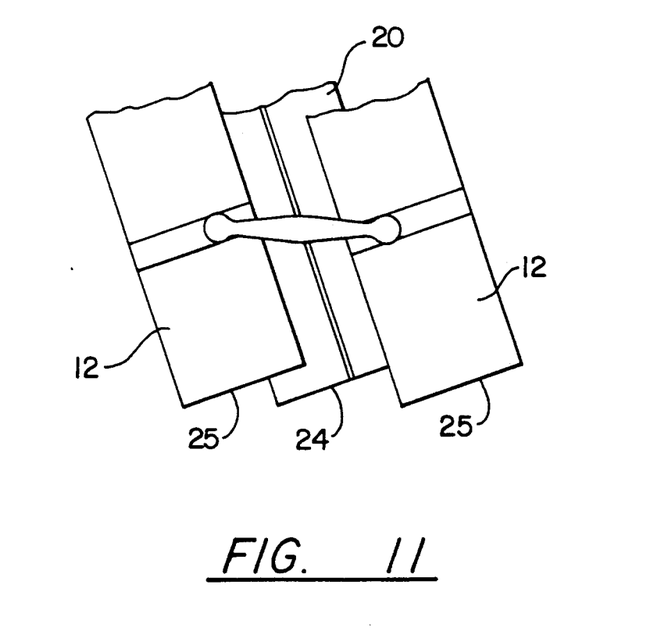
FIG. 11 shows an axial offset condition.

FIG. 11 shows the longitudinal view of FIGS. 6-9 at a condition wherein the divergent flaps 12 are axially offset from one another. As used herein, the term "axially offset" means that the trailing edges 25, 24 of adjacent divergent flaps 12 and seals 20 are not aligned, thereby producing the "sawtooth" pattern shown in FIG. 11. Note that the device 30 of the present invention positions the mounting post 41 midway between the adjacent divergent flaps 12, despite this axially offset condition.

Figure 12:
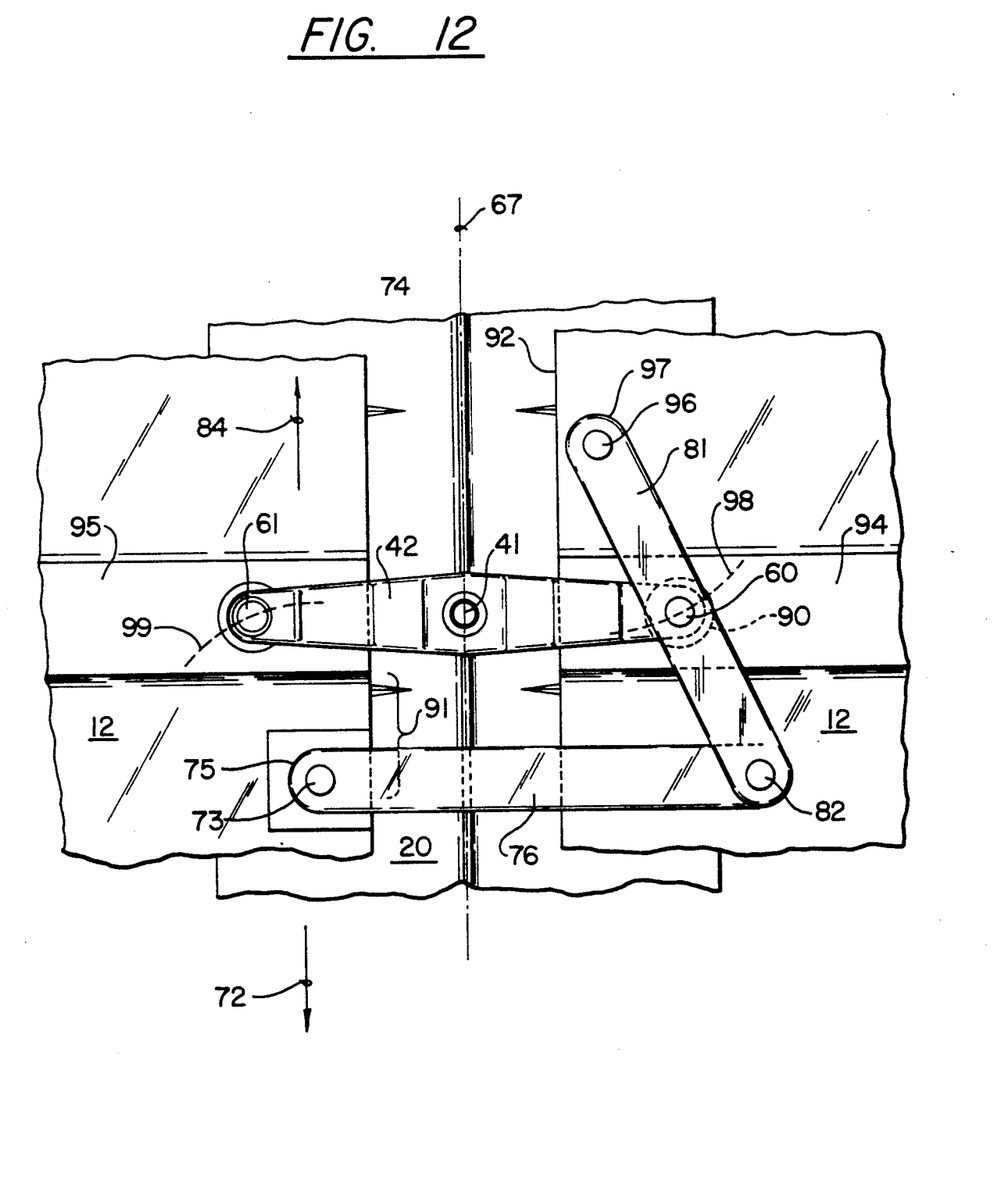
FIG. 12 shows an alternate embodiment of the present invention.

An alternate embodiment of the present invention is shown in FIG. 12. In the alternate embodiment, low friction wear plates 94, 95 are substituted for the tracks 64, 65 of the preferred embodiment, a pivot post 96 is substituted for the positioning bracket 83 and the positioning pin 88 is eliminated. The end 97 of the lever 81 is rotatably secured to the pivot post 96 at a distance from the mid-point 90 of the lever 81 such that the mid-point 90 of the lever 81 is equidistant from the link pin 82 and the pivot post 96. In this alternate embodiment, the longer slider pin 60 is constrained to move in an arc 98 about the pivot post 96, and the shorter slider pin 61 is constrained to move in a similar arc 99. Therefore the wear plates 94, 95 must be somewhat wider than the tracks 64, 65 to ensure that each of the sliders 62, 63 remains on one of the wear plates 94, 95 at all operating positions of the restraint bar 42.

Although this invention has been shown and described with respect to detailed embodiments thereof, it will be understood by those skilled in the art that various changes in form and detail thereof may be made without departing from the spirit and scope of the claimed invention.

I claim:

1. A thrust vectoring axisymmetric convergent/divergent nozzle comprising:
a convergent section having a plurality of circumferentially spaced convergent flaps and an equal number of convergent seals, said convergent seals disposed between said convergent flaps;

a divergent nozzle section having a longitudinal axis, said divergent nozzle section including a plurality of elongated divergent flaps, each of said divergent flaps pivotally connected to one of said convergent flaps and having a gas side facing said longitudinal axis and an air side facing in a direction away from said longitudinal axis, each of said divergent flaps selectively positionable between a first position wherein said each divergent flap is radially offset from one of the adjacent divergent flaps and a second position wherein said each divergent flap is axially offset from one of the adjacent divergent flaps;

a plurality of divergent seals, each of said divergent seals pivotally connected to one of said convergent seals and disposed between adjacent divergent flaps on the gas side thereof and each seal having a gas side surface facing said longitudinal axis and an air side surface facing in a direction away from said longitudinal axis;

a support secured to the air side surface of each of said seals, said support extending longitudinally of the seal secured thereto and including a mounting post extending perpendicular to the gas side surface;

a plurality of seal centering and restraining devices, each device comprising a restraint bar rotatably secured to one of said mounting posts, said restraint bar rotatable in a plane substantially parallel to the gas side surface of the seal attached thereto, said restraint bar having two arms, each arm extending along the air side of an adjacent divergent flap, a slider pivotally connected to each arm adjacent the terminal end thereof, each slider slidably contacting one of the adjacent divergent flaps on the air side thereof and located radially outward from one of said seals, a positioning post fixedly secured to the air side of each of the divergent flaps adjacent the slider thereon, and positioning means for maintaining the position of said mounting post midway between said adjacent divergent flaps when said adjacent divergent flaps are positioned at either said first or second position, said positioning means pivotally secured to said positioning post and pivotally secured to said restraint bar.

2. The nozzle of claim 1 wherein each of the sliders is connected to one of the arms by a spherical bearing.

3. The nozzle of claim 2 wherein each of the divergent flaps is compressively loaded between at least one of the sliders and the seal radially inward therefrom.

4. The nozzle of claim 3 wherein each of the divergent flaps includes at least one transversely extending track on the air side thereof, and each of the sliders is received within one of said tracks.

5. The nozzle of claim 4 wherein the positioning means comprises a bracket fixedly secured to the divergent flap adjacent to the divergent flap having the positioning post fixedly secured thereto, said bracket including a positioning guide slot therein, a positioning pin slidably received within said positioning guide slot, and a positioning linkage pivotally connected to said restraint bar, one end of said linkage assembly pivotally connected to said positioning post and another end of said linkage assembly having said positioning pin therein.

6. The nozzle of claim 5 wherein the positioning linkage comprises a positioning link pivotally connected to said positioning post, and a positioning lever pivotally connected to said positioning link at one end of the lever by a link pin, said lever having said positioning pin located in another end thereof, said lever pivotally connected to said restraint bar at a point on said lever equidistant from said link pin and said positioning pin.

7. The nozzle of claim 6 wherein the guide slot extends in a direction perpendicular to the track of the divergent flap thereon.

8. The nozzle of claim 3 wherein each of the divergent flaps includes at least one wear plate on the air side thereof, and each of the sliders slidably contacts one of said wear plates.

9. The nozzle of claim 8 wherein the positioning means comprises a pivot post fixedly secured to the divergent flap adjacent to the divergent flap having the positioning post fixedly secured thereto, and a positioning linkage pivotally connected to said restraint bar, one end of said linkage assembly pivotally connected to said positioning post and another end of said linkage assembly pivotally connected to said pivot post.

10. The nozzle of claim 9 wherein the positioning linkage comprises a positioning link pivotally connected to said positioning post, and a positioning lever pivotally connected to said positioning link at one end of the lever by a link pin, said lever having another end pivotally connected to said pivot post, said lever pivotally connected to said restraint bar at a point on said lever equidistant from said link pin and said pivot post.

* * * * *